Oct. 21, 1958  D. L. TABERN ET AL  2,857,524
CONTAINER
Filed Jan. 14, 1955  2 Sheets-Sheet 1
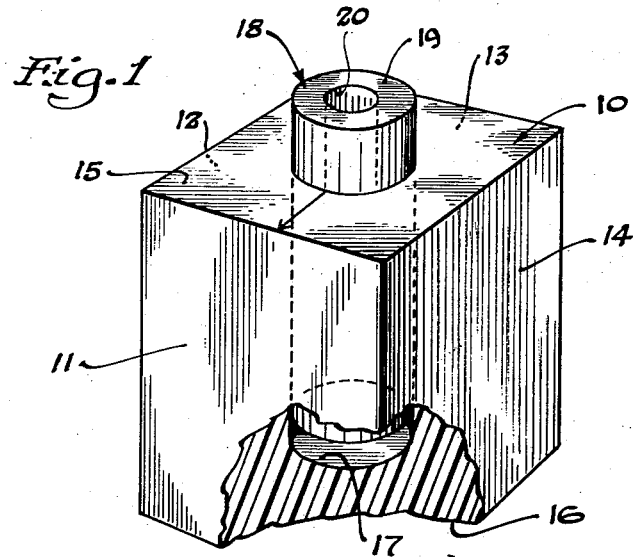
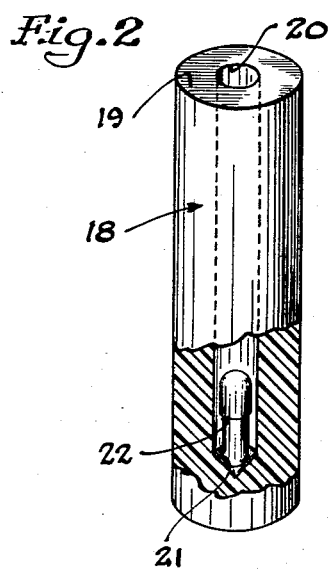
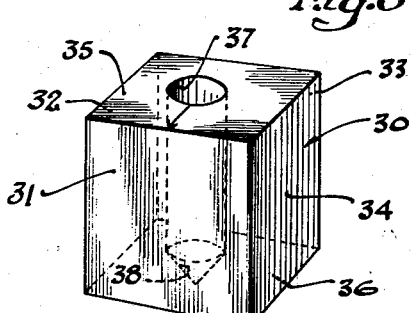
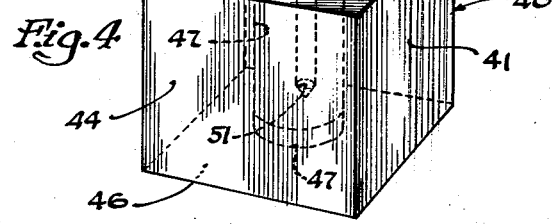
Inventors
Donalee L. Tabern
Robert H. Storey
By William E. Dominick
Attorney Inventors
Donalee L. Tabern
Robert H. Storey
By William E. Dominick
Attorney ium and hypothyroidism. Determinations of the uptake of radioactive iodine is also extremely useful to determine the basal metabolic state of an individual since it is not subject to psychic and environmental errors inherent in most prior methods of determining the basal metabolism rate.

United States Patent Office 2,857,524
Patented Oct. 21, 1958

2,857,524
CONTAINER

Donalee L. Tabern, Lake Bluff, and Robert H. Storey, Waukegan, Ill., assignors to Abbott Laboratories, North Chicago, Ill., a corporation of Illinois Application January 14, 1955, Serial No. 481,772

6 Claims. (Cl. 250—106)

The present invention relates to improved means and method of measuring the in vivo uptake of a radioactive material, and more particularly to apparatus for use in determining more accurately the uptake of a radioactive material, such as iodine 131, by the thyroid gland.

Since the availability of radioactive iodine (I–131), determination of the state of thyroid gland function has become a most important and valuable diagnostic technique available to physicians for determining with a relatively high degree of accuracy the presence of hyperthyroidism and hypothyroidism. Determinations of the uptake of radioactive iodine is also extremely useful to determine the basal metabolic state of an individual since it is not subject to psychic and environmental errors inherent in most prior methods of determining the basal metabolism rate.

Many different methods and instruments are available and employed to determine the thyroid uptake measurements and the final result is always a ratio of two basic determinations; namely, the radioactivity of the I–131 deposited in the thyroid gland at a certain time, divided by the radioactivity of the administered dose of I–131 at substantially the same time. The correct ratio of deposited radioactivity to administered dose will be obtained only if both have been measured under similar conditions. Therefore, after counting the radioactivity in the patient a duplicate of the original dose of radioactivity is placed at the position originally occupied by the patient's neck and its radioactivity is determined. However, the ratio of these two measurements under the above conditions will not necessarily give a correct indication of the true uptake of I–131 by the thyroid gland.

It is known that when the foregoing procedure is followed, one obtains measurements which indicate a greater amount of radioactivity in the thyroid gland than was actually administered and it is common to observe readings which indicate a radioactive uptake of as much as 25 to 35% greater than the true value. While certain of the gamma rays emitted by the radioactive iodine are absorbable by the portion of the neck between the thyroid gland and the counting tube, there is an appreciable amount of scattering and reflection of the gamma rays by the tissue and the bony structure at the sides and back of the neck which cause the abnormally high values measured. Thus, if steps are not taken to correct the foregoing erroneous readings, the measurements obtained would be greatly misleading and of little value to the physician.

Heretofore the method commonly used to correct the foregoing errors in the readings obtained was to disperse the radioactive material (I–131 salt) in a 50 cc. volumetric flask and immerse the said flask in a large beaker containing water with the front of the flask approximately 1 cm. from the wall of the beaker facing the counting tube. Using measurements with a pulse height analyzer providing channel readings which enable quantitative studies to be made of the nature and intensity of the radiation being emitted from a given source, it has been possible to accurately study the emitted energy distribution and to compare the radioactive energy emitted from the I–131 within the 50 cc. volumetric flask immersed in the said beaker of water with that from cadavers into the thyroids of which has been injected known amounts of radioactive material. Measurements with a pulse height analyzer have shown that the volumetric flask method described above provides a reasonably good approximation of the values obtained from measuring the activity from a thyroid in a human being containing the same amount of radioactive material. The method of using a volumetric flask immersed in a large beaker of water, however, is inconvenient and difficult to carry out quickly because of the necessity of preparing radioactive solutions and the difficulty of accurately measuring and handling the said solutions.

It is, therefore, an object of the present invention to provide an improved and more convenient method of accurately determining the actual radioactive uptake of the thyroid of a human being.

It is also an object of the present invention to provide an improved apparatus having the radioactive reflective characteristics of the neck of a human being.

It is a still further object of the present invention to provide an improved apparatus and a more convenient method for carrying out radioactive "uptake studies" with small gelatin capsules containing radioactive material adsorbed on the interior wall thereof.

Other objects of the invention will be apparent from the detailed description and claims to follow.

The foregoing objects and other advantages of the present invention will be readily appreciated by reference to the following detailed description when considered in conjunction with the accompanying drawing showing the embodiment of the invention wherein:

Figure 1 is a perspective view partially in vertical section showing the apparatus of the present invention in partially assembled position;

Figure 2 is a perspective view partially in vertical section showing the insert plug of Figure 1;

Figure 3 shows a perspective view of a modified form of the apparatus shown in Figure 1;

Figure 4 is a perspective view of still another modified form of the invention shown in Figure 1.

Figure 5:
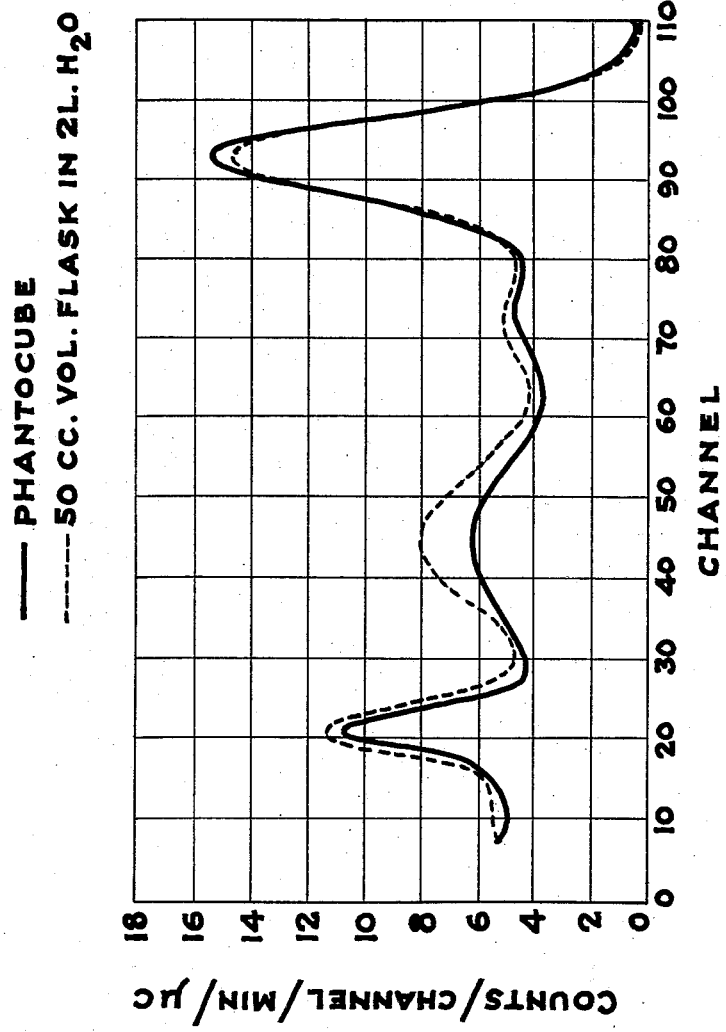
Figure 5 shows the energy spectrum produced when radioactive material is used with the apparatus of Figure 1 and also the energy spectrum produced when an identical quantity of radioactive material is placed in a 50 cc. volumetric flask immersed in two liters of water.

In the present invention it has been discovered that instead of using large volumes of liquid, plastic, hardwood, or the like in a form essentially the size of a human neck as was heretofore thought necessary, it is preferable to use a small cubicle plastic block to simulate the radioactive reflective properties of the human neck. More specifically, it has been determined that a small cubicle plastic block having an axial passage extending inwardly from the upper surface thereof with the axis being at a distance of 3.5 cm. from the side of said cube facing the ray counting apparatus will simulate very closely the radioactive energy reflective characteristics of the average neck and thyroid.

In Figure 1 of the drawing, the numeral 10 represents a block defined by rectangular lateral surfaces 11, 12, 13, and 14 and an apertured rectangular upper surface 15 and a lower supporting surface 16. The upper surface 15 is provided with a preferably cylindrical opening 17 extending only partially through said block with the axis thereof being perpendicular to the supporting surface 16 and substantially parallel with lateral surface 11. Extending reciprocably into the opening 17 is a preferably cylindrical plug 18 having a diameter only slightly less than the diameter of the opening 17 and having a length preferably slightly longer than the said opening 17 so that the upper end extends above the upper surface 15 to facilitate removal of the plug 18 from the opening 17. Extending inwardly from the upper surface 19 of the plug 18 is a closed end axial passage 20 extending substantially the entire length of the said plug 18 to a point spaced slightly inwardly of the lower surface thereof. The closed end of axial passage 20 is defined preferably by an inwardly tapering wall section 21 which serves as a centering means for a radioactive capsule 22 disposed therein.

In Figure 3 of the drawing is shown a modified form of the invention in which the rectangular block 30 is defined by lateral surfaces 31, 32, 33, and 34 and an apertured rectangular upper surface 35 and a lower supporting surface 36. The upper surface 35 is provided with a preferably cylindrical opening 37 extending to a point spaced inwardly of the lower surface of the block. Lower end of cylindrical opening 37 is preferably defined by inwardly tapering walls 38 which provide centering means for a radioactive capsule disposed therein. The axis of the opening 37 is perpendicular to the lower supporting surface 36 and is substantially parallel to lateral surface 31.

In Figure 4 of the drawing is shown still another modified form of the invention which enables the device to be used under a wider variation in the operating conditions with increased accuracy. With the apparatus shown in Figures 1 and 3, it is occasionally necessary to interpose between the block 10 and the radioactive counter one or more relatively thin sheets of a plastic material, preferably similar to that of the block 10, to simulate and compensate for added thickness of the tissue of obese patients. The apparatus shown in Figure 4 obviates the necessity of using added sheets of plastic material and comprises a rectangular block 40 defined by lateral surfaces 41, 42, 43, and 44, an apertured rectangular upper surface 45, and a lower supporting surface 46. The upper surface 45 is provided with a preferably cylindrical opening 47 extending partially through the block 40 with the axis thereof being perpendicular to the supporting surface 46 and substantially parallel with the lateral surface 41. Extending reciprocably into the opening 47 is a preferably cylindrical plug 48 having a diameter only slightly less than the diameter of the opening 47 and having a length preferably slightly longer than the said opening 47 so that the upper end extends above the upper surface 45 to facilitate removal of the plug 48 from the opening 47. Extending inwardly from the upper surface 49 of the plug 48 is a longitudinal passage 50 extending substantially the entire length of the plug 48 and to a point spaced slightly inwardly of the lower end of the plug 48. The lower end of the axial passage 50 is preferably defined by a conically tapered wall section 51 which serves as a centering means for a radioactive capsule disposed therein. The plug 48 is also adapted to be rotated about the longitudinal axis thereof so as to effect a variation in the distance between the passage 50 and the rectangular surface 41. Thus, whereas the passage 50 is a distance of 3.5 cm. from the rectangular surface 41 when the index line 52 on the plug 48 and the index line 53 on the center of the upper edge of the surface 45 are in alignment, when the plug 48 is rotated about its longitudinal axis 90 degrees the distance between the passage 50 and the rectangular surface 41 can be significantly varied from the original 3.5 cm. distance. Thus, by suitably adjusting the degree of rotation of the plug 48, as by placing the index line 52 in alignment with the index line 54, variations in the distance between the passage 50 and the rectangular surface 41 may be obtained, thereby eliminating the necessity of interposing additional sheets of plastic material between the block 40 and the radioactive counter. If frictional resistance between the plug 48 and the walls of passage 47 is not sufficient to maintain the plug 48 in the desired position, positive positioning means can be used, such as a detent, or the like.

In each of the embodiments of the present invention shown in Figures 1 and 3, the radioactive capsule receiving passage 20 and opening 37, respectively, has its axis spaced inwardly from lateral surfaces 11 and 31, respectively, a distance of 3.5 cm., a distance which has been found to be critical.

In the preferred embodiment of the invention, the block 10 is 6 cm. in width, 6 cm. in depth and 9 cm. in height. And, as previously described, the axis of the opening or passage therein is in each instance a distance of 3.5 cm. from the rectangular lateral surface which is placed toward the radioactive measuring instrument. The dimensions of the block other than the critical dimension of 3.5 cm. between one lateral surface and the axis of the radioactive receiving opening or passage therein may be varied appreciably without departing from the broad invention. Thus, for example, a block which has a width of 6 cm. and a depth of 4.5 cm. and a height of 9 cm. has substantially the same radioactive reflective characteristics as the preferred embodiment of the invention. Likewise, a block which is 4.5 cm. wide, 4.5 cm. deep and 9 cm. high also has substantially the same characteristics as the block of the preferred embodiment of the invention. A block which is 6.9 cm. wide by 6.9 cm. deep and 8.9 cm. high also is found to have the same radioactive reflective characteristics as the preferred embodiment. When the dimensions of the block are 3.1 cm. wide, 4.5 cm. deep and 9 cm. high, however, the radioactive reflective characteristics are appreciably in error as compared with the preferred embodiment of the invention and the comparable values obtained with a cadaver under identical conditions and, therefore, is not suitable for making accurate measurements of the type attained by the present invention, even when the axis of the radioactive receiving opening therein is maintained at a distance of 3.5 cm. from the lateral surface facing the radioactive detector measuring device.

The block of the present invention is preferably formed of a plastic material, such as Lucite, nylon, methyl methacrylate, or similar hard plastic material, although it is also suitable to manufacture the block from hardwood or similar material which readily transmits radioactice rays without appreciable screening.

In the operation of the apparatus of the present invention, after having measured the radioactive rays emitted from the throat of a patient to which the radioactive material has been administered, the block 10 is placed in an identical position with respect to the measuring instrument as the patient's neck previously occupied and a radioactive capsule is inserted in passage 20 of plug 18 which is, in turn, placed in opening 17 of the block positioned with the lateral surface 11 perpendicular to the measuring tube of the radioactive counter. From the readings obtained from the patient's neck and from the block containing the radioactive capsule positioned in the above-described manner, the uptake of radioactive material by the thyroid of the patient can be readily determined with a high percentage of accuracy.

Where the radioactive material is administered in liquid form, it may be more convenient to determine the strength of the radioactive material by forming a solution thereof having a concentration similar to that administered to the patient. In this instance the plug 18 is removed from block 10 and a glass or plastic container having a diameter similar to that of the plug 18 is inserted in the opening 17 of the block 10 and the radioactive solution placed therein. The readings are obtained in the same manner as when a radioactive capsule is used.

The modified apparatus shown in Figures 3 and 4 of the drawings are used for measuring the radioactive output of a radioactive capsule in the same manner as with the block shown in Figure 1 by inserting the radioactive capsule in opening 37 of the block 30 or in passage 50 of block 40, respectively.

In Figure 5 of the drawing is shown the energy spectrum produced when using the apparatus of Figure 1 embodying the preferred form of the present invention with a $\frac{1}{32}$ inch lead filter disposed between the source of radioactive rays and the scintillation counter which is used to detent the radioactive rays emitted. On the same coordinance is shown the energy distribution curve obtained when an identical quantity of radioactive material is placed in a 50 cc. volumetric flask and the said flask immersed in 2 liters of water with the edge of said flask being spaced 1 cm. from the wall of the beaker in accordance with standard procedure heretofore described. It is thus apparent that the apparatus of the present invention can be used in place of the standard 50 cc. volumetric flask method heretofore employed as the standard method. And, when a $\frac{1}{32}$ inch lead filted is interposed between the block 10 and the radioactive counting apparatus, the accuracy of the measurements obtained is improved and provides a highly accurate means for determining the radioactive uptake by the thyroid of a human being.

The present invention is particularly useful in conjunction with the use of radioactive capsules in which the radioactive salt is absorbed on the inner surfaces of the capsule as more fully described in applicant's co-pending U. S. application Serial No. 415,168, filed March 9, 1954.

Others may readily adapt the invention for use under various conditions of service, by employing one or more of the novel features disclosed or equivalents thereof. As at present advised with respect to the apparent scope of our invention, we desire to claim the following subject matter.

We claim:

1. An apparatus for radioactive material comprising a body section which readily transmits radioactive rays without appreciable screening thereof having a lateral surface with at least a portion extending perpendicularly from a lower supporting surface, a lower supporting surface and an apertured upper surface providing a passage extending into the interior of said body section, and a plug member which readily transmits radioactive rays without appreciable screening thereof being removably disposed in said passage and having a length greater than the said passage, said plug member having a small diameter opening therein extending from the upper surface thereof to a point spaced inwardly from the lower end thereof and which is adapted to support therein a radioactive material.

2. An apparatus for radioactive material comprising a body section which readily transmits radioactive rays without appreciable screening thereof having a lower supporting surface and lateral surface at least a portion of which extends perpendicularly from said supporting surface and an apertured upper surface providing a passage extending into the interior of said body section, said passage having the axis thereof parallel to a lateral surface extending perpendicularly from said supporting surface, and a plug member which readily transmits radioactive rays without appreciable screening thereof being removably disposed in said passage and having a length greater than the said passage, said plug member having a small diameter opening therein the axis of which is substantially parallel with said lateral surface extending perpendicularly from said supporting surface, said opening extending from the upper surface of the said plug member to a point spaced inwardly from the lower end thereof and being adapted to support entirely within the said opening a radioactive material.

3. An apparatus for radioactive material comprising a body section which readily transmits radioactive rays without appreciable screening thereof having a rectangular lower supporting surface and rectangular lateral surfaces extending perpendicularly to said supporting surface and an apertured rectangular upper surface providing a cylindrical passage extending into the interior of said body section, said passage having the axis thereof parallel to the said lateral surfaces, and a cylindrical plug member which readily transmits radioactive rays without appreciable screening thereof being removably disposed in said passage and having a diameter less than the said passage and of a length greater than the said passage, said plug member having a small diameter opening therein the axis of which is parallel with the said lateral surfaces extending from the upper surface thereof to a point spaced inwardly from the lower end thereof and adapted to support entirely within the said opening a radioactive material containing capsule.

4. An apparatus for radioactive material comprising a body section which readily transmits radioactive rays without appreciable screening thereof having a rectangular lower supporting surface and rectangular lateral surfaces extending perpendicularly to said supporting surface and an apertured rectangular upper surface providing a cylindrical passage extending into the interior of said body section, said passage having the axis thereof parallel to the said lateral surfaces, and a cylindrical plug member which readily transmits radioactive rays without appreciable screening thereof being removably disposed in said passage and having a diameter less than the said passage and of a length greater than the said passage, said plug member having a small diameter cylindrical axial opening therein the walls of which are substantially parallel with the said lateral surfaces and extending from the upper surface of the said plug to a point spaced inwardly from the lower end thereof and adapted to support entirely within the said opening a radioactive containing capsule.

5. An apparatus for radioactive material comprising a body section which readily transmits radioactive rays without appreciable screening thereof having a lower supporting surface and a lateral surface extending perpendicularly to said supporting surface and an apertured upper surface providing a cylindrical passage extending into the interior of said body section, said passage having the axis thereof parallel to the said lateral surfaces, and a cylindrical plug member which readily transmits radioactive rays without appreciable screening thereof being removably disposed in said passage and having a diameter less than the said passage and of a length greater than the said passage, said plug member being rotatable in said passage about its longitudinal axis and having a small diameter cylindrical opening therein the longitudinal axis of which is spaced from the longitudinal axis of the said plug member and being parallel therewith, said opening extending from the upper surface of said plug to a point spaced inwardly from the lower end thereof and adapted to support entirely within the said opening a radioactive material containing capsule.

6. An apparatus for radioactive material as in claim 4 comprising a plastic body section which readily transmits radioactive rays without appreciable screening thereof having a plurality of lateral surfaces, a lower supporting surface and an apertured upper surface providing an opening extending into the interior of said body section, said opening having the longitudinal axis thereof spaced from one of said lateral surfaces a distance of 3.5 cm.

References Cited in the file of this patent

UNITED STATES PATENTS

| | | |
|---|---|---|
| 2,675,487 | Schallert et al. | Apr. 13, 1954 |
| 2,682,352 | Hawkins et al. | June 29, 1954 |